United States Patent [19]

Eremity et al.

[11] Patent Number: 4,890,119

[45] Date of Patent: Dec. 26, 1989

[54] VARIABLE ORIENTATION INK CATCHER

[75] Inventors: Frank Eremity, Hanover Park; George Arway, Norridge, both of Ill.

[73] Assignee: A. B. Dick Company, Chicago, Ill.

[21] Appl. No.: 295,989

[22] Filed: Jan. 12, 1989

[51] Int. Cl.[4] .............................................. G01D 15/18

[52] U.S. Cl. .................................. 346/75; 346/140 R

[58] Field of Search .............................. 346/75, 140 R

[56] References Cited

U.S. PATENT DOCUMENTS 4,611,216 9/1986 Ishikawa et al. ...................... 346/75

*Primary Examiner*—H. Broome

*Assistant Examiner*—Gerald E. Preston

*Attorney, Agent, or Firm*—Rockey and Rifkin

[57] ABSTRACT

A variable orientation ink catcher for use with ink jet printing equipment receives unused ink drops. The drops are returned to the printing system for reuse. The catcher includes an arcuate receiving portion offset from an outlet port. Caught ink flows by gravity from the receiving portion via a reservoir to the outlet port through a wide range of angular orientations.

6 Claims, 4 Drawing Sheets

VARIABLE ORIENTATION INK CATCHER

BACKGROUND OF THE INVENTION

This invention relates to an ink catcher utilized in conjunction with ink jet printing equipment such as manufactured by the present assignee. The purpose of an ink catcher in such equipment is known. See, for example, U.S. Pat. Nos. 4,023,182 and 4,360,817 assigned to the present assignee and which are incorporated herein by reference.

In general, an ink catcher is provided to collect droplets which are not directed onto a substrate for marking purposes. These droplets are collected by the catcher and returned to the ink jet system for further printing. The operation of a synchronous ink jet printing device requires that unused ink drops be captured and removed from the drop deflection structure to avoid operating problems. In general, drop catchers fall into two broad categories: those that use a vacuum flow system and those which employ only gravity flow.

A vacuum system, in which air is drawn through the ink catcher to ensure flow of the ink droplets into the catcher and away from the deflection structure, has certain disadvantages. When the air flow created by the vacuum source is sufficiently large to prevent ink buildup on the catcher and thereby to minimize ink misting, there is often excessive evaporation of the ink solvent. Thus, where high air flow is employed, evaporation becomes excessive and the evaporated components of the ink must be replaced in order to preserve the ink formulation and to maintain desired ink characteristics. As is known in this art, maintenance of ink parameters is critical accurate drop placement on the substrate being marked. In addition to the operating problems evaporation causes, the cost associated with replenishment also limits the extent to which this technique can be beneficially employed. Accordingly, excessive evaporation rates are highly undesirable and to be avoided, if possible.

Prior efforts to provide sufficient air flow without excessive evaporation have not been entirely successful. Such efforts include the use of small diameter tubes which produce a low air flow in the catcher and thereby limit the extent of solvent evaporation. Such systems, however, have produced insufficient flow to prevent ink build-up around the catcher mouth. Systems which employ large diameter tubes permit a higher air flow but, again, unacceptably high levels of solvent evaporation.

Previously mentioned U.S. Pat. No. 4,023,182, while quite successful in alleviating this problem, results in increased product cost and equipment maintenance due to the need for an additional separator device downstream of the catcher. Further, the separator is limited to specified spacial orientations requiring the need for additional valving in some applications. If possible, this additional complexity is to be avoided.

Another approach to this problem is disclosed in the aforementioned U.S. Pat. No. 4,360,817 wherein a coaxial flow ink catcher is disclosed. In this device, a vacuum ink return system produces a large vacuum flow at the catcher mouth but returns the unused ink to the remote ink supply through a low-flow vacuum line. This solution also has increased cost and complexity penalties because of the need for a dual vacuum path in the ink return.

Accordingly, it is desirable to provide a catcher which does not use vacuum flow if such return system can meet the requirements of preventing ink build-up on the catcher mouth and minimizing ink misting. As known by those in this art, ink misting is the phenomenon where ink droplets, upon striking a surface, such as the catcher, mist or break up into smaller particles which can literally form a particle cloud around the catcher and interfere with proper placement of drops on the adjacent substrate.

One known prior art device utilizes an ink catcher which is essentially a hollow cylinder closed at both ends. Ink, upon entering the cylinder through an opening therein, is permitted to puddle in the lower portion of the catcher and then to flow to an outlet under the influence of gravity. This device results in lower evaporation rates than other approaches. However, its proper operation is highly sensitive to the orientation of the print head with which it is associated. In particular, the orientation must be such that the ink will flow from the catcher by the force of gravity. Such positioning is not always possible due to the design of this prior device.

Accordingly, it is desirable to provide a gravity flow ink catcher which is capable of various orientations so that the ink jet printing head can be positioned as desired by the requirements of the particular printing application. It is also desirable that the ink catcher be low in cost, simple in design, and not require any specific setup, as is required by prior designs.

It is accordingly the object of the present invention to provide such an ink catcher. Specifically, the ink catcher of the present invention does not require vacuum induced air flow across the mouth of the catcher to prevent ink build-up or to minimize ink misting. The ink catcher of the present invention employs gravity flow. Because of its unique geometry, desirable ink puddling which reduces evaporation, is achieved while at the same time misting and build-up at the mouth of the ink catcher is avoided. Furthermore, the catcher can be used at multiple orientations suitable for most ink jet printing applications.

DETAILED DESCRIPTION

Figure 1:
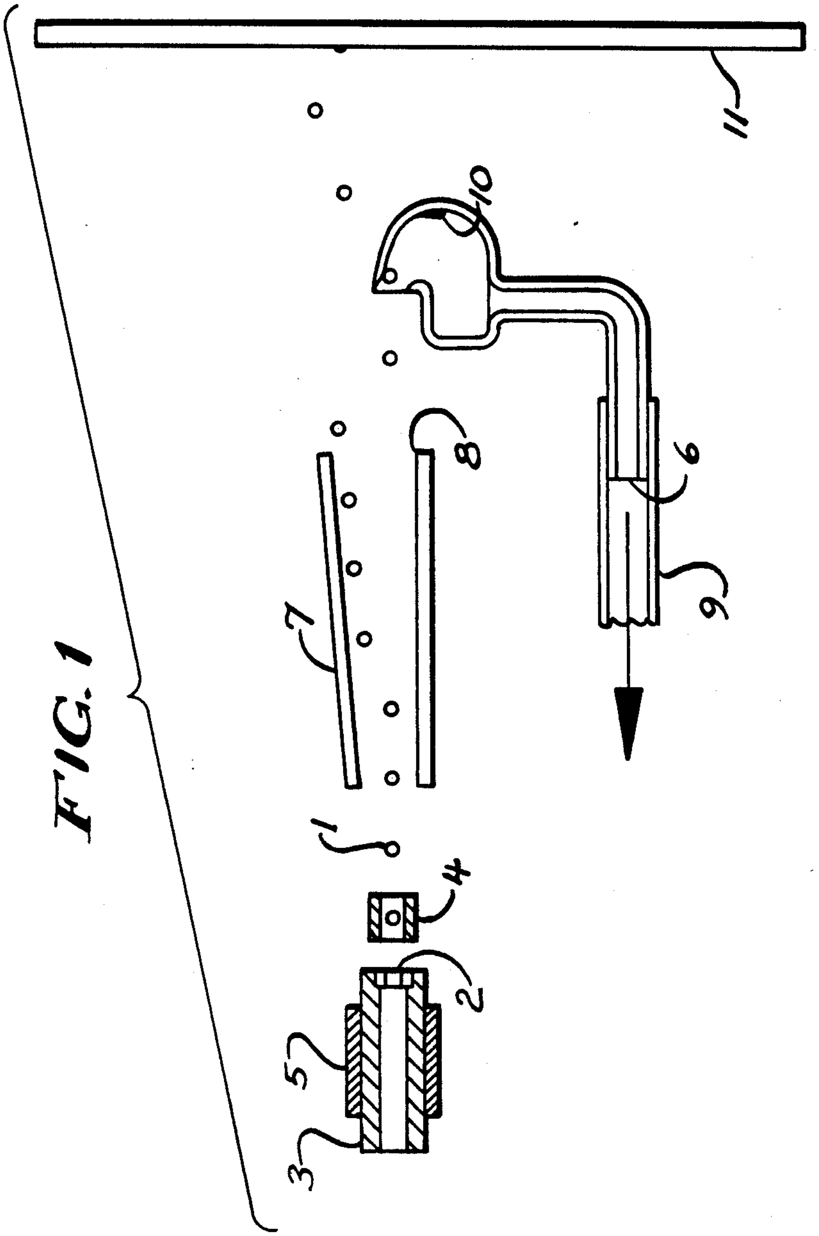
FIG. 1 is a schematic illustration of the relevant portions of an ink jet printing system useful in explaining the ink catcher of the present invention.

Referring to FIG. 1, a schematic illustration of the relevant portions of an ink jet printing system is shown. Ink drops 1 emanate from an ink jet nozzle orifice 2 which is located at one end of a typical nozzle housing 3. The ink which is forced through the nozzle is acted upon by the piezo electric device 5 to create the discrete drops which are then selectively charged by a charging electrode 4. Those drops which receive a charge are deflected as they pass through an electrostatic deflection field which exists between the electrodes 7 and 8. Drops which do not receive a charge are not deflected onto the substrate 11. These drops are the stopped by an ink catcher 10 according to the present invention.

The caught ink is brought to an outlet port 6 under the influence of gravity. The ink is returned from the port to a reservoir for reuse by means of a return tube 9 connected to the outlet port 6. No air flow is needed to clear the mouth of the catcher and, therefore, the return line contains substantially only liquid. Ink can be caused to flow in the return line 9 by the usual means such as a pump.

Because the returning ink is not mixed with air as is the case in prior art vacuum systems a lower cost return system having better evaporation loss characteristics is obtained.

Figure 2B:
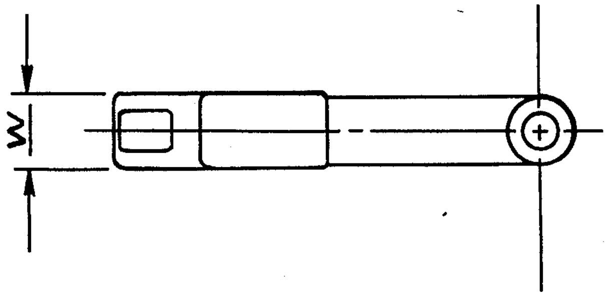
FIG. 2 (A as side, B as front) is a cross sectional view of the ink catcher according to the present invention illustrating its internal geometry.
Figure 2A:
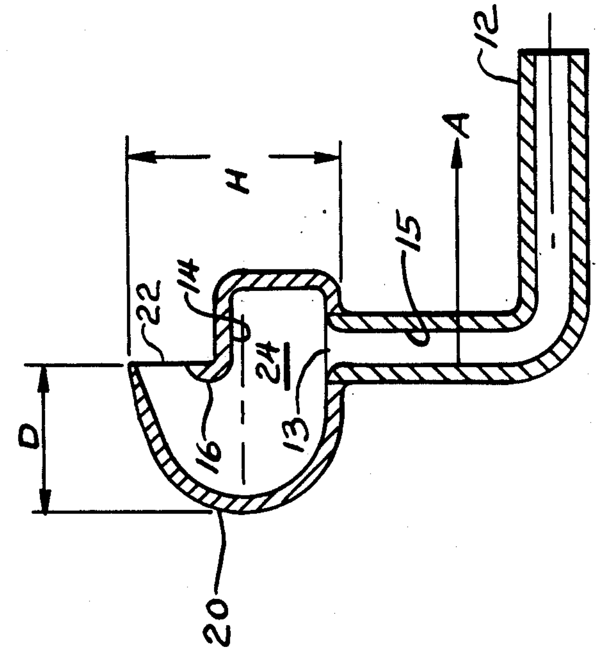

Referring to FIG. 2, the geometry which is essential to the advantages of the present invention are illustrated in greater detail. The catcher has an upper portion which is generally arcuate including a semi-circular rear wall 20. The rear wall terminates at its upper end thereof in an opening 22 which forms the entrance through which drops are collected by the device. The drops enter the device and strike the rear wall 20 as indicated in FIG. 1. The drops, by force of gravity, collect in a lower portion of the device which includes an offset, generally rectangular reservoir portion 24. This offset arrangement is important to obtaining the advantages of the present invention as will be described. In the reservoir 24 the ink is collected or puddled. Eventually, it enters an outlet port designated 12 in FIG. 2 from which it passes to the return tube 9 communicating with the system ink reservoir. The outlet port 12, in the embodiment shown in FIGS. 1 and 2, consists of an L-shaped tubular section which is generally in the same plane as the catcher (a vertical plane as viewed in FIG. 2B). As is apparent from the foregoing, the catcher is generally elongate in shape (the width "W" is less than or equal to the length "H") as viewed along a line 23 in FIGS. 2A, 2B. As there shown, the line or alignment axis 23 extends generally vertically through the area of the opening 22 and the bottom of reservoir portion 24. This elongate shape of the catcher is feature of the present invention which permits the catcher to have a variable orientation over greater angular displacements from the vertical than prior art catchers, as more fully described hereinafter.

In order to optimize the advantages of the present invention, the following geometrical relationships should be maintained:

1. The opening 13 to the outlet port 12 should be below the surface 14 to provide the cavity or reservoir 24 in which the ink can accumulate (puddle).
2. The rear wall 15 of the outlet 12 is positioned to be offset from the surface 16 in the direction indicated by the arrow A in FIG. 2A. This is necessary in order to prevent dripping out of the mouth 22 when the catcher is deployed at fairly small angles to the horizontal (see, for example, FIG. 4D).
3. The width W (FIG. 2B) should be less than or equal to the height H in order to operate when the head is rotated axially about the ink stream.

Summarizing, the ink catcher of the present invention operates by gravity flow only at a large variety of angular orientations. This is possible due to the features of the invention including the arcuate back wall 20 which reduces misting around the mouth 22, the provision of an offset reservoir 24 to prevent back flow and to puddle the ink to reduce evaporative loss, and the offset between the opening 13 and the lip 16 which prevents unintended back flow when the catcher is positioned at shallow angles to the horizontal.

Figure 3A:
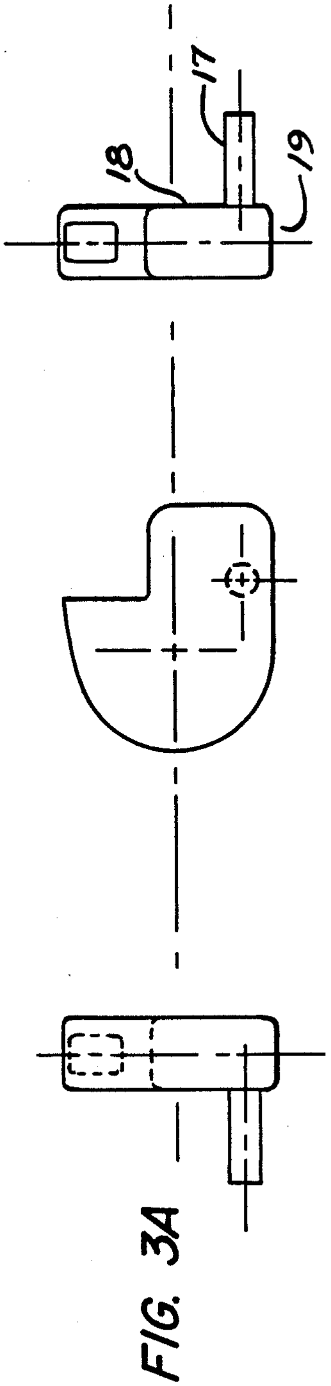
FIGS. 3A and 3B illustrate alternative placements of the outlet port.
Figure 3B:
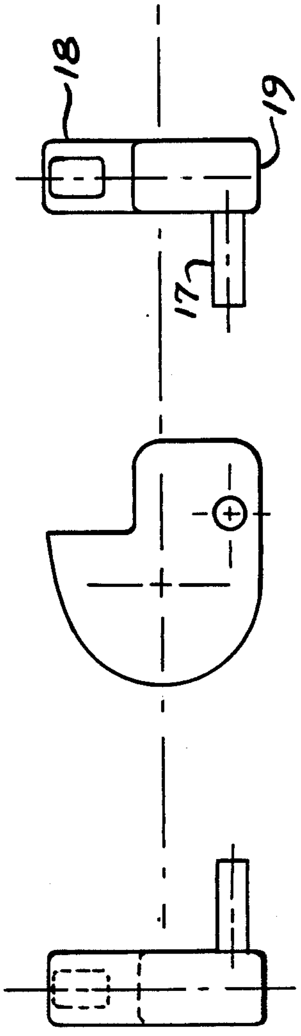

Referring to FIG. 3, two alternate embodiments are illustrated. In these embodiments, the outlet fitting, designated 17, is located on either side of the catcher body 18 rather than at bottom of the catcher body 10. These embodiments are useful if even greater angular displacement from the vertical is required. Indeed, the embodiments of FIGS. 3A–3C can operate efficiently almost horizontally.

Figures 4A, 4B, 4C, 4D:
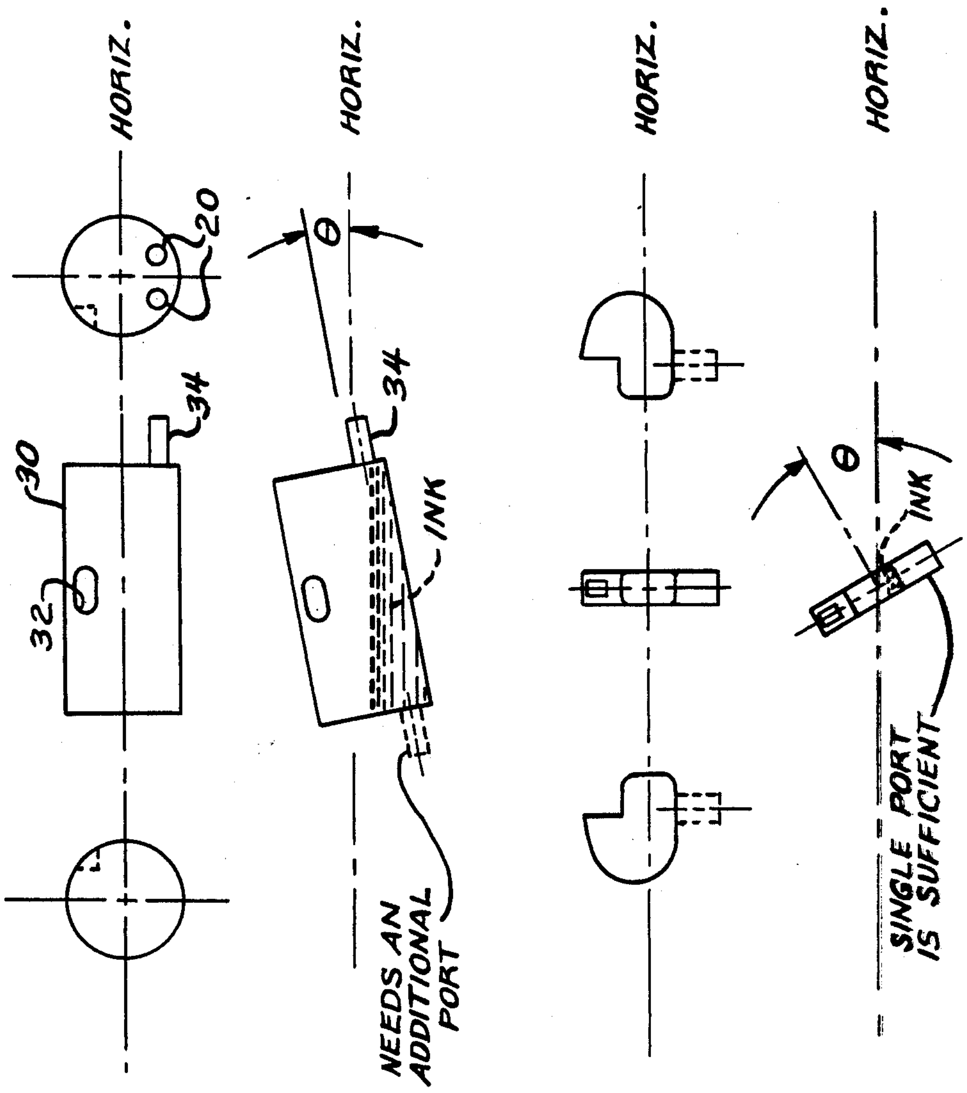
FIG. 4A PRIOR ART
FIG. 4B PRIOR ART
FIG. 4 (A, B, C, D) provides a comparison between certain prior art and the present invention with respect to use of the catcher at various orientations.

Referring to FIG. 4, there is illustrated a comparison of a particular prior art device (FIGS. 4A and 4B) with the ink catcher of the present invention. As described earlier in this specification, a certain prior art device, manufactured by Hitachi, employs an ink catcher which is essentially a hollow cylinder closed at both ends. The ink catcher designated 30 in FIG. 4A, has an opening 32 at the top portion thereof through which ink drops enter the device. An outlet port 34 is provided at only one end near the bottom of the device. As will be apparent, ink drops enter through the opening 32, collect in the bottom of the device, and pass through a tube to a reservoir for reuse through the port 34.

As illustrated in FIG. 4B, the Hitachi device cannot be operated at more than very small angles to the horizontal. Otherwise, the ink would puddle in the container but not pass out of the port 34 to the return system. Thus, the positioning of the Hitachi catcher is critical and limits the flexibility of the system. It would be necessary to provide an additional port such as indicated by the broken lines in FIG. 4B in order to make this device function at the angle illustrated.

Referring to FIGS. 4C and 4D, the ability of the present invention to operate under such conditions is illustrated. As shown in FIG. 4C, the ink catcher of the present invention can, of course, operate so that the alignment axis is at ninety degrees to the horizontal. The device can be rotated to either side of the vertical so that the alignment axis is displaced at successively larger angles from the vertical without the need for additional ports due to the unique geometric configuration employed.

While we have shown and described embodiments of the invention, it will be understood that this description and illustrations are offered merely by way of example, and that the invention is to be limited in scope only as to the appended claims.

What is claimed is:

1. A variable orientation ink catcher for an ink jet system comprising:

a housing having an ink receiving portion, a reservoir portion and an outlet communicating ink from said reservoir portion back to said ink jet system for reuse;

said receiving portion including an opening for receiving ink drops and an arcuate rear surface spaced from said opening to stop said drops with minimal misting adjacent to said opening;

said reservoir portion constituting a cavity in said housing positioned below said ink receiving portion to permit collected ink to puddle therein;

said outlet being positioned in the lower portion of said reservoir and forwardly of said opening;

said housing having an axis extending through said opening and said reservoir being elongated along said axis to maximize the range of angular orientations at which the catcher can operate.

2. The device of claim 1 wherein said arcuate rear surface is semi-circular.

3. The device of claim 1 wherein said reservoir is defined by the lower portion of said arcuate surface and a front surface of said housing extending forward of said opening.

4. The device of claim 1 wherein said outlet comprises an L-shaped conduit extending downward from said reservoir portion.

5. The device of claim 1 wherein said outlet extends transversely from a side wall of said reservoir portion.

6. The device of claim 1 wherein said housing has a width less than its height.

* * * * *

UNITED STATES PATENT AND TRADEMARK OFFICE

CERTIFICATE OF CORRECTION

PATENT NO. : 4,890,119

DATED : December 26, 1989

INVENTOR(S) : Eremity et al

It is certified that error appears in the above-indentified patent and that said Letters Patent is hereby corrected as shown below:

In the drawings, sheet 2 of 4, Figure 2B should be deleted to be replaced with the corrected Figure 2B, as shown on the attached page.

Signed and Sealed this

Fourteenth Day of December, 1993

Attest:

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 4,890,119
DATED : December 26, 1989
INVENTOR(S) : Eremity et al

It is certified that error appears in the above-indentified patent and that said Letters Patent is hereby corrected as shown below:

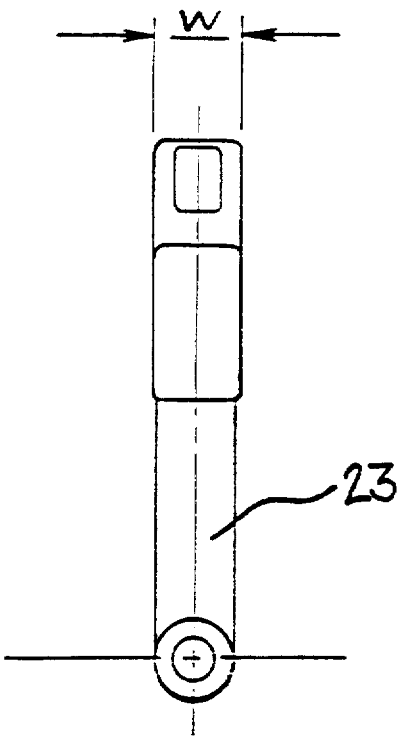

FIG. 2B